United States Patent
Kritzler et al.

(10) Patent No.: US 11,099,633 B2
(45) Date of Patent: Aug. 24, 2021

(54) AUTHORING AUGMENTED REALITY EXPERIENCES USING AUGMENTED REALITY AND VIRTUAL REALITY

(71) Applicant: Siemens Aktiengesellschaft, Munich (DE)

(72) Inventors: Mareike Kritzler, San Francisco, CA (US); Asa MacWilliams, Fürstenfeldbruck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/604,225

(22) PCT Filed: Apr. 27, 2017

(86) PCT No.: PCT/US2017/029757
§ 371 (c)(1),
(2) Date: Oct. 10, 2019

(87) PCT Pub. No.: WO2018/199948
PCT Pub. Date: Nov. 1, 2018

(65) Prior Publication Data
US 2020/0117268 A1    Apr. 16, 2020

(51) Int. Cl.
*G06T 19/00*    (2011.01)
*G06F 3/01*    (2006.01)
(Continued)

(52) U.S. Cl.
CPC ............ *G06F 3/011* (2013.01); *G02B 27/017* (2013.01); *G06F 3/017* (2013.01); *G06F 3/167* (2013.01);
(Continued)

(58) Field of Classification Search
None
See application file for complete search history.

(56) References Cited

U.S. PATENT DOCUMENTS 8,209,183 B1 *  6/2012  Patel ................... G06F 40/232
                                                    704/270
9,412,201 B2    8/2016  Kinnebrew et al.
(Continued)

FOREIGN PATENT DOCUMENTS

KR    20150108842 A    9/2015

OTHER PUBLICATIONS

International Search Report dated Oct. 10, 2017; International Application No. PCT/US2017/029757; Filing Date: Apr. 27, 2017; 11 pages.
(Continued)

*Primary Examiner* — Joni Hsu (57) ABSTRACT

Examples of techniques for augmented reality authoring using virtual reality are disclosed. In one example implementation according to aspects of the present disclosure, a computer-implemented method includes receiving, by a virtual reality processing system, a depth map from an augmented reality processing system, wherein the depth map is a map of a scene. The method further includes authoring, using the virtual reality processing system, an augmented reality experience in a virtual reality environment based at least in part on the depth map. The method further includes transmitting, by the virtual reality processing system, the augmented reality experience to the augmented reality processing system.

20 Claims, 6 Drawing Sheets

(51) Int. Cl.
*G02B 27/01* (2006.01)
*G06F 3/16* (2006.01)
(52) U.S. Cl.
CPC .... *G06T 19/006* (2013.01); *G02B 2027/0138* (2013.01)

(56) References Cited

U.S. PATENT DOCUMENTS

| | | | |
|---|---|---|---|
| 9,665,983 B2* | 5/2017 | Spivack | G06Q 30/0643 |
| 2014/0204117 A1 | 7/2014 | Kamuda et al. | |
| 2015/0040074 A1* | 2/2015 | Hofmann | G06F 3/04815 |
| | | | 715/852 |
| 2015/0161821 A1* | 6/2015 | Mazula | G06T 19/006 |
| | | | 345/419 |
| 2016/0012640 A1 | 1/2016 | Abraham | |
| 2016/0049004 A1 | 2/2016 | Mullins et al. | |
| 2016/0093108 A1* | 3/2016 | Mao | A63F 13/30 |
| | | | 345/633 |
| 2017/0372457 A1* | 12/2017 | Sylvan | G06F 1/163 |

OTHER PUBLICATIONS

Korean Office Action dated Sep. 28, 2020; Application No. 2019-7034464; 5 pages.
European Examination Report dated Nov. 26, 2020; European patent application 17 722 601.6; 3 pages.

\* cited by examiner

AUTHORING AUGMENTED REALITY EXPERIENCES USING AUGMENTED REALITY AND VIRTUAL REALITY

BACKGROUND

This application is a national phase filing under 35 U.S.C. § 371 of International Patent Application No. PCT/US2017/029757, filed Apr. 27, 2017, which is incorporated herein by reference in its entirety.

Augmented reality (AR) applications superimpose digital information on top of real-world objects (i.e., scenes). This information can be visualized with AR systems equipped with a camera and a display. AR can be useful to a human user when performing training, simulation, conferencing, collaboration, maintenance, repair, quality assurance, and other tasks.

Virtual reality (VR) presents a digital representation of a real-world environment to a user and enables the user to experience the actual size and dimensions of the real-world environment in a complete digital representation. The digital representation is displayed to the user via a VR system, which can be a head-mounted VR device. VR overcomes limitations of traditional two-dimensional computer screens and limited interaction with a computer via traditional (e.g., mouse, touchpad, touchscreen, etc.) inputs.

SUMMARY

According to examples of the present disclosure, techniques including methods, systems, and/or computer program products for augmented reality authoring using virtual reality are provided. An exemplary computer-implemented method includes receiving, by a virtual reality processing system, a depth map from an augmented reality processing system, wherein the depth map is a map of a scene. The method further includes authoring, using the virtual reality processing system, an augmented reality experience in a virtual reality environment based at least in part on the depth map. The method further includes transmitting, by the virtual reality processing system, the augmented reality experience to the augmented reality processing system.

A system for augmented reality authoring using virtual reality is also provided. The system includes an augmented reality processing system including a first memory comprising first computer readable instructions, and a first processing device for executing the first computer readable instructions for performing a first method. The first method includes capturing, by the first processing device, a scene, and generating, by the first processing device, a depth map of the scene. The system also includes a virtual reality processing system including a second memory comprising second computer readable instructions, and a second processing device for executing the second computer readable instructions for performing a second method. The second method includes receiving, by the second processing device, the depth map from the augmented reality processing system, enabling, by the second processing device, authoring an augmented reality experience in a virtual reality environment based at least in part on the depth map, and transmitting, by the second processing device, the augmented reality experience to at least one additional augmented reality processing system A computer program product for augmented reality authoring using virtual reality is also provided. The computer program product includes a computer readable storage medium having program instructions embodied therewith, the program instructions being executable by a virtual reality processing system to cause a processing device to perform a method. The method includes receiving, by a virtual reality processing system, a depth map from an augmented reality processing system, wherein the depth map is a map of a scene. The method further includes authoring, using the virtual reality processing system, an augmented reality experience in a virtual reality environment based at least in part on the depth map. The method further includes transmitting, by the virtual reality processing system, the augmented reality experience to the augmented reality processing system.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Augmented reality (AR) provides augmented reality experiences to users. Traditionally, these AR experiences are created (i.e., authored) using preprocessing techniques by humans using, for example, specialized software tools available for general purpose processing systems (e.g., a laptop, a desktop, a tablet, etc.). According to some examples, a human expert (i.e., an author) in a particular field can create an augmented reality experience particular to that field. The AR experience can then be used to guide or to train a technician, new employee, etc. The author uses traditional input devices, such as a keyboard, mouse, touchpad, etc., to build the AR experience on a computer screen.

Authoring of AR experiences traditionally uses software tools (i.e., authoring applications) executed on traditional general purpose processing systems and are application and/or web-based. An existing digital three-dimensional (3D) representation of a real-world environment, an object, etc. to be augmented is loaded into the authoring application and represented as a point-cloud or edge-based computer aided design (CAD) model. The authoring application enables a user to manipulate (e.g., rotate, flip, etc.) the digital representation and to navigate through the representation to create an AR experience. Digital content (e.g. pictures, videos, 3D models, etc.) can be added to the representation and arranged in relation to the digital representation. However, existing authoring applications are not designed to run on head-mounted devices and do not allow user to author AR experiences in the modality in which the AR experience will be used.

The present techniques provide for augmented reality authoring using virtual reality (VR). According to an example of the present disclosure, an AR processing system captures a depth map and transmits the depth map to a VR processing system. The VR processing system receives the depth map and enables a user to author an AR experience in a virtual reality environment by capturing gestures of the user (or another user) and manipulating the virtual reality environment based on the gestures. The AR experience is then transmitted back to the AR processing system to enable a user of the AR processing system to use the AR experience.

According to examples of the present disclosure, an author experiences AR and VR while authoring AR experiences for use by a field worker, technician, engineer, trainee, etc. In such cases, the expert wears a head-mounted, hands-free device that is equipped with a display, depth camera, and gesture sensor. The camera scans real-world environments (e.g., objects, rooms, environments, etc.) that are to be augmented. From these scans, a depth map is created, which can be used for augmentation authoring in VR, and serves as the basis for the authoring. An authoring application provides digital content for authoring, such as predefined 3D tools. The digital content is aligned, scaled, rotated, and/or translated to the physical world via drag and drop functionality recognized by the gesture sensor based on gestures of the author. If a real-world object is not currently in a field-of-view of the author but are to be augmented, an existing 3D CAD model of the particular object can be displayed in VR in order to build up work instructs for that particular object.

The present techniques enable users to author AR applications in the same modality in which the AR experience is going to be used. The present techniques also provide an intuitive user interface, which directly visualizes the result of content alignment. This enables users to be fully immersed in the scene and focus on the task. Moreover, the use of head-mounted devices enables users to be in the AR and VR environments while authoring. The gesture sensor enables the user to intuitively interact with the AR and VR environments. Moreover, the inclusion of a library of tools, objects, etc., facilitates fast setup of AR scenes by enabling a user to reuse existing content.

Example embodiments of the disclosure include or yield various technical features, technical effects, and/or improvements to technology. Example embodiments of the disclosure provide augmented reality authoring using virtual reality by receiving a depth map from an AR processing system, transmitting the depth map to a VR processing system, and enabling authoring of an AR experience in a VR environment based on the depth map to create the AR experience for later use in an AR environment. These aspects of the disclosure constitute technical features that yield the technical effect of generating an augmented reality experience using a fully-immersive virtual reality environment that enables the reuse of objects/tools and other features for efficient AR environment authoring. As a result of these technical features and technical effects, an augmented reality authoring using virtual reality in accordance with example embodiments of the disclosure represents an improvement to existing AR authoring techniques. It should be appreciated that the above examples of technical features, technical effects, and improvements to technology of example embodiments of the disclosure are merely illustrative and not exhaustive.

Figure 1:
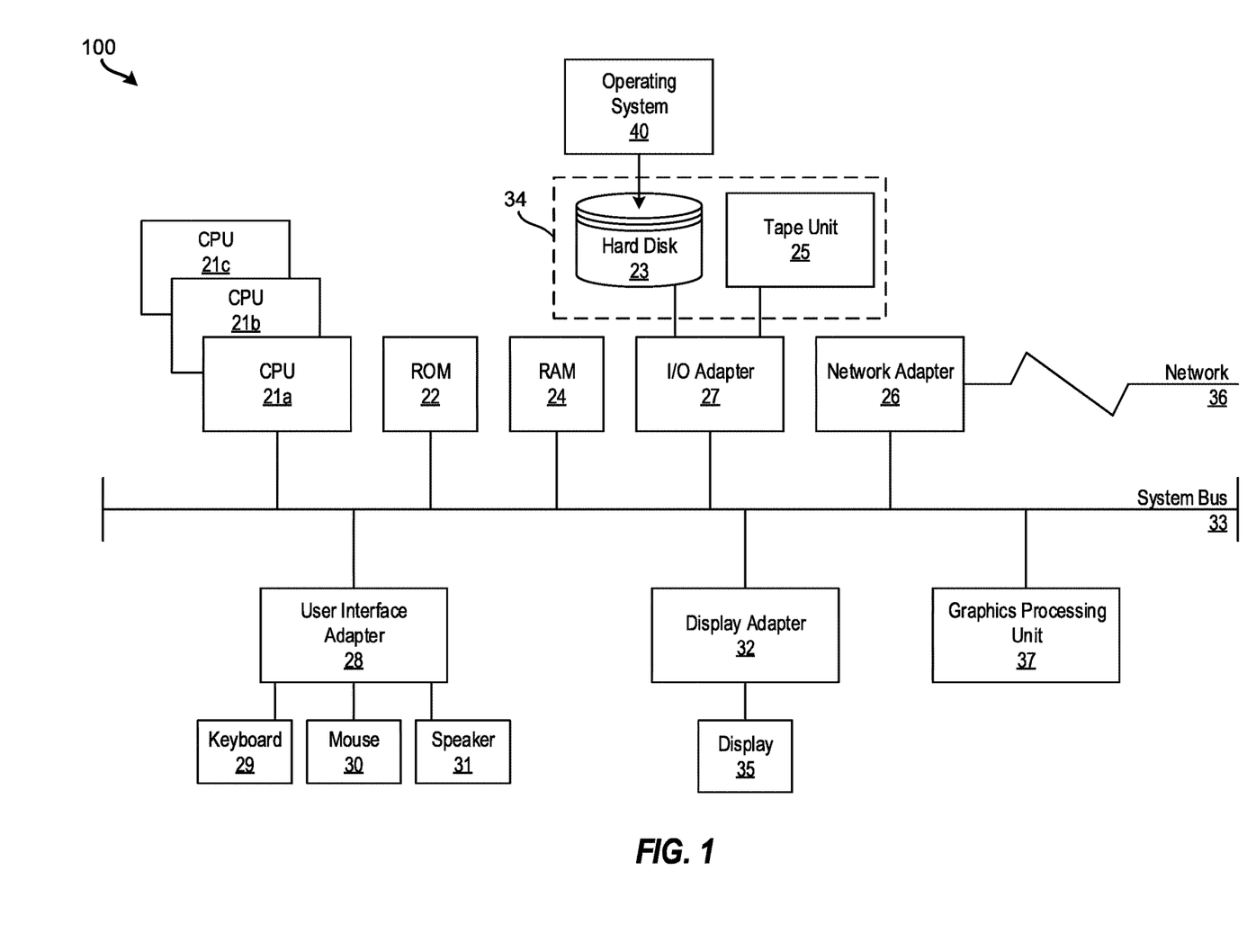
FIG. 1 depicts a block diagram of a processing system for implementing the techniques described herein according to examples of the present disclosure.

It is understood that embodiments of the present invention are capable of being implemented in conjunction with any other suitable type of computing environment now known or later developed. For example, FIG. 1 depicts a block diagram of a processing system 100 for implementing the techniques described herein. In examples, processing system 100 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 can be stored in mass storage 34. A network adapter 26 interconnects system bus 33 with an outside network 36 enabling processing system 100 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 100.

Figure 2:
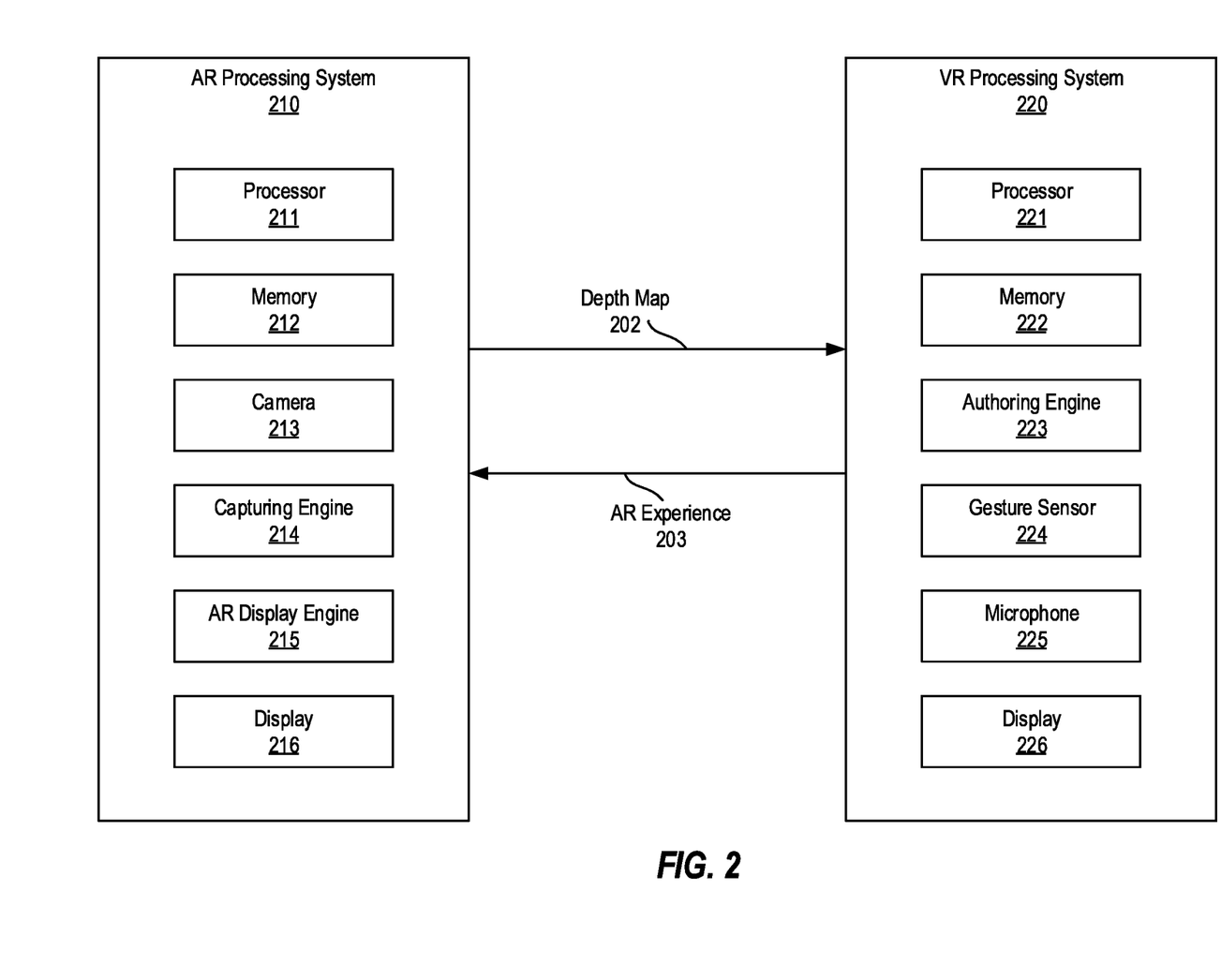
FIG. 2 depicts a block diagram of an augmented reality processing system and a virtual reality processing system according to examples of the present disclosure.

FIG. 2 depicts a block diagram of an augmented reality processing system 210 and a virtual reality processing system 220 according to examples of the present disclosure. The various components, modules, engines, etc. described regarding FIG. 2 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include a processing device (e.g., the processor 211 or the processor 221) for executing those instructions. Thus a system memory (e.g., the memory 212 or the memory 222) can store program instructions that when executed by processing device implement the engines described herein. Other engines can also be utilized to include other features and functionality described in other examples herein.

According to aspects of the present disclosure, the AR system 210 includes the processor 211, the memory 212, a camera 213, a capturing engine 214, an AR display engine 215, and a display 216. The VR system 220 includes the processor 221, the memory 222, an authoring engine 223, a gesture sensor 224, a microphone 225, and a display 226. Alternatively or additionally, the AR system 210 and/or the VR system 220 can include dedicated hardware, such as one or more integrated circuits, ASICs, application specific special processors (ASSPs), field programmable gate arrays (FPGAs), or any combination of the foregoing examples of dedicated hardware, for performing the techniques described herein. In some embodiments, additional components can be implemented. For example, the AR system 210 can include multiple cameras, multiple displays, etc. Similarly, the VR system 220 can include multiple gesture sensors, multiple microphones, multiple displays, etc.

Figure 6:
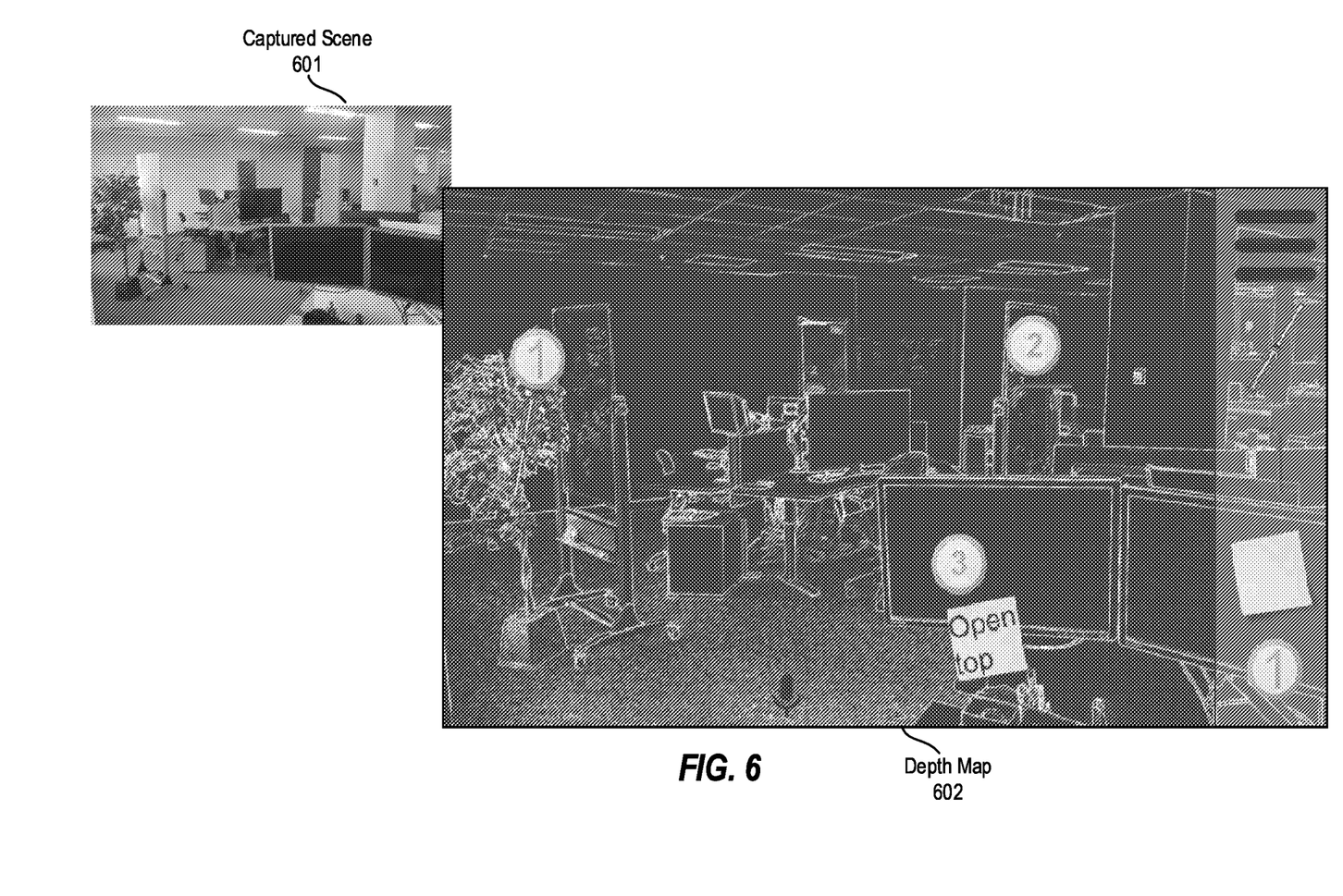
FIG. 6 depicts a depth map of a scene according to examples of the present disclosure.

Regarding the AR processing system 210, the capturing engine 214 uses the camera 213 to capture an image of a scene. The camera 213 can be any suitable type of camera or device for capturing an image. The capturing engine 214 generates a depth map of the scene using the captured image. A depth map contains information relating to distances of the surfaces of objects in the scene from a viewpoint (i.e., from the camera). An example of a depth map is depicted in FIG. 6. In particular, FIG. 6 depicts a depth map of a scene according to aspects of the present disclosure. The capturing engine 214 captures a scene as captured scene 601, and the capturing engine 214 generates a depth map 602 of the captured scene 601.

Once the depth map is generated, the AR processing system 210 transmits the depth map 202 (e.g., the depth map 602) to the VR processing system 220. The VR processing system 220 receives the depth map and uses the depth map to create a virtual reality environment to display to a user of the VR processing system 220 on a display 226.

The user can then author, using the authoring engine 223, an augmented reality experience in the virtual reality environment using inputs such as gestures, audio, etc. For example, the user can make hand gestures, which are recognized and processed by the gesture sensor 224, to manipulate the virtual reality environment. Gestures are generally a movement of a part of the user's body, such as the user's hand. Using gestures, the user can, for example, move an object, press a button, perform a series of steps, flip a switch, and/or other tasks in the virtual reality environment.

According to some examples, the authoring and/or annotating can begin using the AR processing system 210. For example, a field worker using the AR processing system 210 could point out details that are not included in the depth map (e.g., color, texture, temperature etc.) in the AR environment. In such cases, the AR processing system 210 can also transfer annotations to the depth map made using the AR processing system 210 to the VR processing system 220.

The authoring engine 223 contains predefined 3D tools, objects, etc., available for the user to include in the augmented reality experience. The user can define workflow elements/steps, use voice recognition to build workflows, and can provide gesture inputs to place/manipulate predefined elements.

In some examples, a microphone 225 can be used to receive audio instructions from the user. For example, the user can say "record" to start recording a series of steps that the user then performs using gestures recognized by the gesture sensor 224. The user can also record audio instructions to accompany a gesture. These audio instructions can later be played back when the augmented reality experience is consumed on an augmented reality processing system (e.g., the AR processing system 210). Additionally, the microphone 225 can be used to search for existing objects (e.g., "Show me a wrench") or to interact with the VR environment to enable or disable objects to make the authoring process easier.

Once the authoring is complete, the AR experience 204 is transmitted back to the AR processing system 210. The AR processing system 210 can display the AR experience 204 to a user of the AR processing system 210 using the display 216, for example.

Figure 3:
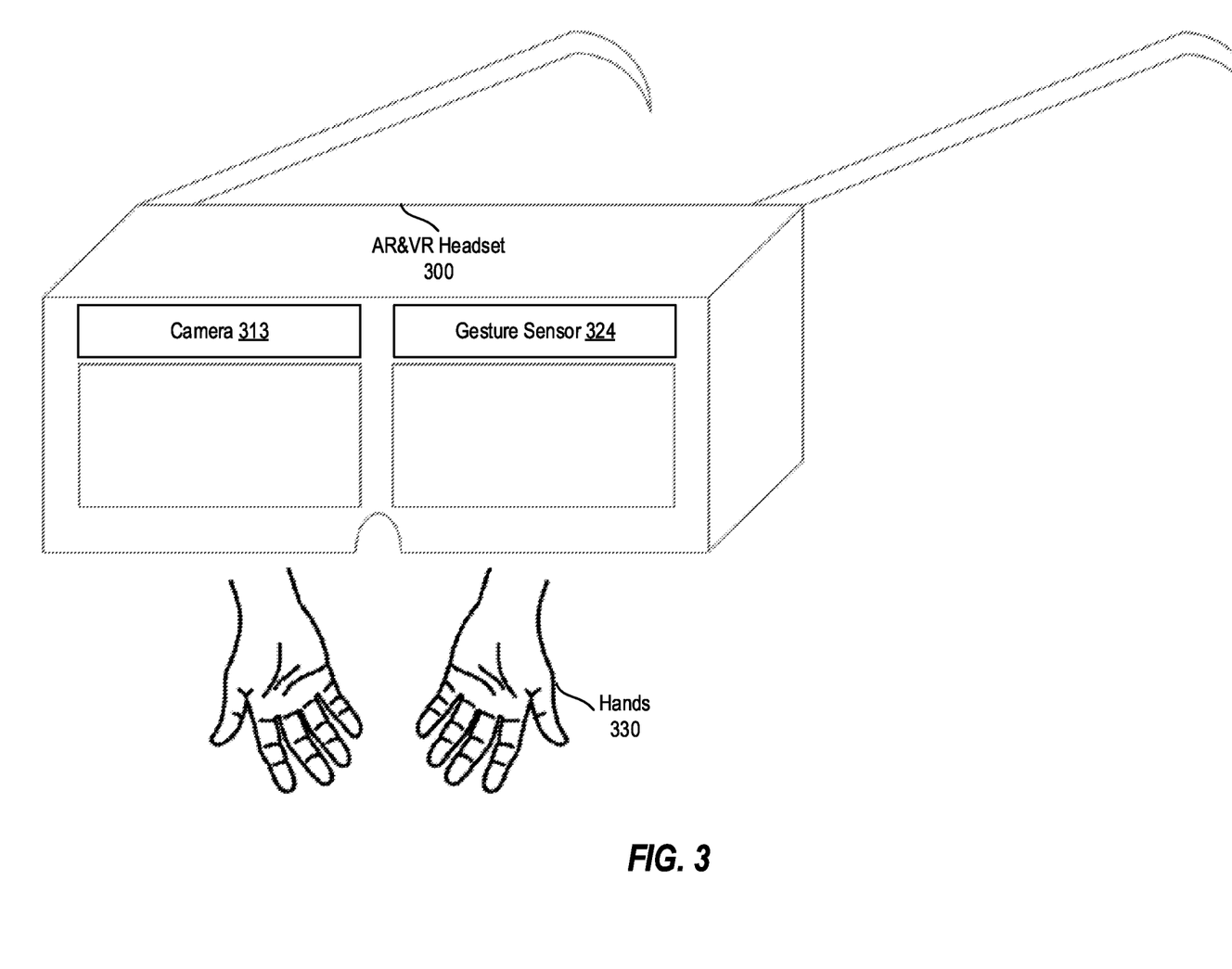
FIG. 3 depicts a block diagram of a headset for augmented reality authoring using virtual reality according to examples of the present disclosure.

FIG. 3 depicts a block diagram of an AR and VR headset 300 (referred to as "headset 300") for augmented reality authoring using virtual reality according to examples of the present disclosure. The headset 300 can include aspects of the AR processing system 210 and the VR processing system 220. In particular, the headset 300 includes a camera 313 and a gesture sensor 324.

The headset can be head-mounted such that it is worn on a user's head. The headset 300 can capture a scene (i.e., a real-world environment) using the camera 313 and generate a depth map of the scene. The camera 313 captures a scene, which can be used to generate a depth map as described herein.

Instead of using a traditional computer processing system for authoring, the headset 300 can be used. The use of the headset 300 enables an author to build an augmented reality experience with his/her hands, voice, etc.

The gesture sensor 324 detects movements, or gestures, of the hands 330 as inputs for manipulation/alignment of digital content to the physical environment while authoring in the virtual reality environment. This enables the author to create work instructions and accessible visual workflows quickly and intuitively.

Figure 4:
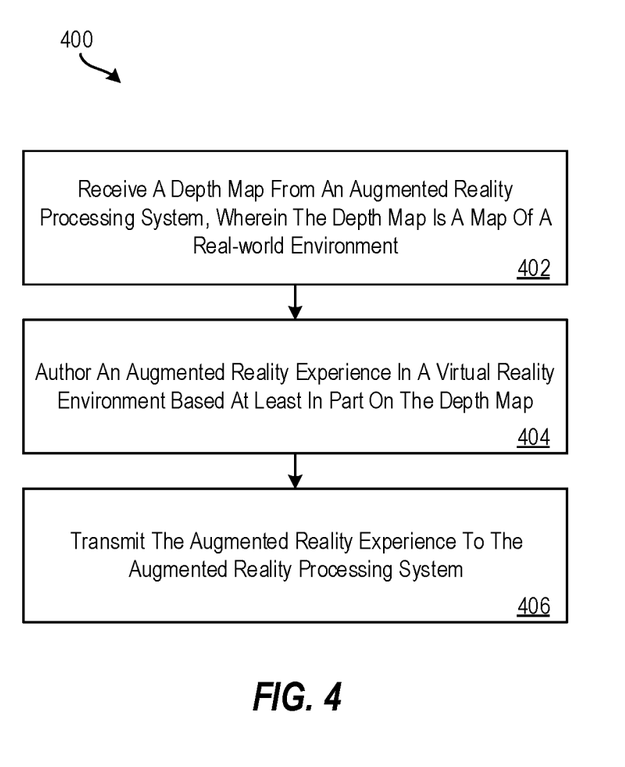
FIG. 4 depicts a flow diagram of a method for augmented reality authoring using virtual reality according to examples of the present disclosure.

FIG. 4 depicts a flow diagram of a method 400 for augmented reality authoring using virtual reality according to examples of the present disclosure. The method can be performed by suitable processing systems, such as the processing system 100, the AR processing system 210, the VR processing system 220, the headset 300, and suitable combinations thereof. The AR processing system 210 and/or the VR processing system 220 can be head-mounted processing systems.

At block 402, the VR processing system 220 receives a depth map (e.g., the depth map 602) from an augmented reality processing system 210. The depth map is a map of a real-world environment (i.e., a scene). The AR processing system 210 can include a camera that captures the real-world environment.

At block 404, the VR processing system 220 is used to author an augmented reality experience in a virtual reality environment based at least in part on the depth map. The VR processing system 220 can include a gesture sensor 224 and/or a microphone 225 to enable a user to interact with the VR processing system 220 to author the augmented reality experience. For example, authoring the augmented reality experience can include capturing gestures using the gesture sensor and using the gestures to manipulate the virtual reality environment. Similarly, authoring the augmented reality experience can include capturing audio using the microphone and using the audio to manipulate (e.g., add instructions, start a recording, etc.) the virtual reality environment. The same or a different user than captured the depth map can perform the authoring. For example, a field worker could use the AR processing system 210 to capture a depth map, and a subject matter expert can use the VR processing system 220 to perform the authoring.

At block 406, the VR processing system 220 transmits the augmented reality experience to the AR processing system 210. This enables a user of the AR processing system 210 to utilize the augmented reality experience. For example, the AR display engine 215 can display the augmented reality experience to the user on a display 216 of the AR processing system 210.

Additional processes also can be included. For example, the augmented reality experience can be transmitted to another AR processing system instead of and/or in addition to the AR processing system 210. It should be understood that the processes depicted in FIG. 4 represent illustrations, and that other processes can be added or existing processes can be removed, modified, or rearranged without departing from the scope and spirit of the present disclosure.

Figure 5:
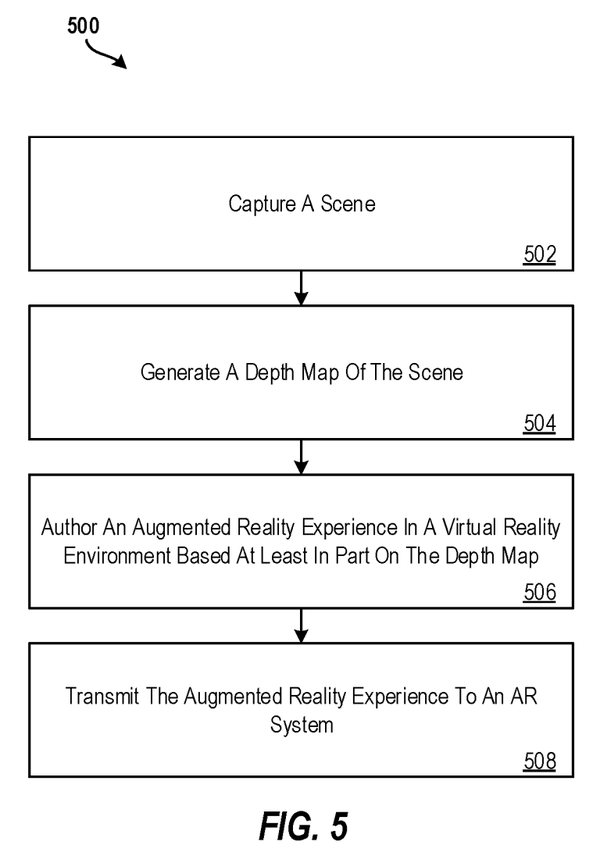
FIG. 5 depicts a flow diagram of a method for augmented reality authoring using virtual reality according to examples of the present disclosure.

FIG. 5 depicts a flow diagram of a method 500 for augmented reality authoring using virtual reality according to examples of the present disclosure. The method can be performed by suitable processing systems, such as the processing system 100, the AR processing system 210, the VR processing system 220, the headset 300, and suitable combinations thereof. The AR processing system 210 and/or the VR processing system 220 can be head-mounted processing systems. In particular, the example of FIG. 5 is described with reference to the headset 300.

At block 502, the headset 300 captures a scene using the camera 313 and, at block 504, uses the scene to generate a depth map (e.g., the depth map 602). According to some embodiments, the headset 300 can be used to annotate the depth map prior to authoring an augmented reality experience. At block 506, the headset 300 enables authoring of an augmented reality experience in a virtual reality environment based on the depth map. The authoring can be performed using gestures detected by the gesture sensor 324 for example. The headset 300 then transmits the augmented reality experience to an AR system (e.g., the AR processing system 210 of FIG. 2).

Additional processes also can be included, and it should be understood that the processes depicted in FIG. 5 represent illustrations, and that other processes can be added or existing processes can be removed, modified, or rearranged without departing from the scope and spirit of the present disclosure.

As discussed above, FIG. 6 depicts a depth map 601 of a scene according to aspects of the present disclosure. FIG. 6 also depicts a toolbar of authoring tools 603 on the right-hand side of the depth map 601. The authoring tools 603 can be used by an author to create the AR experience 204. The authoring tools 603 enable an author to drag, for example, predefined tools into the scene of the depth map 601 in order to augment the real-life objects of the scene. Other predefined elements can be used in order to determine the order of steps of a workflow, for example, and describe tasks that need to be fulfilled when the AR experience 204 is later used.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for authorizing an augmented reality application virtual reality, the method comprising:
   capturing, by an augmented reality processing system, a scene,
   generating, by the augmented reality processing system, a depth map of the scene;
   receiving, by a virtual reality processing system, the depth map;
   generating, by the virtual reality processing system, a virtual reality environment based on the depth map;
   receiving, by gesture sensors of the virtual reality processing system, gesture inputs to manipulate the virtual reality environment;
   receiving, by a microphone of the virtual reality processing system, audio instructions to manipulate the virtual reality environment and to enable or disable objects in the virtual reality environment;
   authoring, by an authoring engine, an augmented reality experience in the virtual reality environment based on the gesture inputs and audio instructions to manipulate the virtual reality environment; and
   transmitting, by the virtual reality processing system, the augmented reality experience to the augmented reality processing system.

2. The computer-implemented method of claim 1, further comprising transmitting, by the virtual reality processing system, the augmented reality experience to at least one additional augmented reality processing system.

3. The computer-implemented method of claim 1, wherein:
   the augmented reality processing system comprises a camera; and
   the camera captures the scene.

4. The computer-implemented method of claim 1, wherein the virtual reality processing system is a head-mounted virtual reality processing system.

5. The computer-implemented method of claim 1, wherein the augmented reality processing system is a head-mounted augmented reality processing system.

6. The computer-implemented method of claim 1, wherein the virtual reality processing system comprises a microphone.

7. The computer-implemented method of claim 6, wherein authoring the augmented reality experience comprises:
   capturing gestures using the gesture sensor;
   capturing audio using the microphone; and
   using the gestures and the audio to manipulate an object in the virtual reality environment.

8. A system for authoring an augmented reality application using virtual reality, the system comprising:
   an augmented reality processing system comprising a first memory comprising first computer readable instructions, and a first processing device for executing the first computer readable instructions for performing a first method, the first method comprising:
      capturing, by the first processing device, a scene, and
      generating, by the first processing device, a depth map of the scene; and
   a virtual reality processing system comprising a gesture sensor, an authoring engine, a second memory comprising second computer readable instructions, and a second processing device for executing the second computer readable instructions for performing a second method, the second method comprising:
      receiving, by the second processing device, the depth map from the augmented reality processing system,
      generating, by the second processing device, a virtual reality environment based on the depth map,
      receiving, by the gesture sensor, gesture inputs to manipulate the virtual reality environment,
      receiving, by a microphone of the virtual reality processing system, audio instructions to manipulate the virtual reality environment and to enable or disable objects in the virtual reality environment,
      authoring, by the authoring engine, an augmented reality experience in the virtual reality environment based on the gesture inputs and audio instructions to manipulate the virtual reality environment, and
      transmitting, by the second processing device, the augmented reality experience to at least one additional augmented reality processing system.

9. The system of claim 8, wherein authoring the augmented reality experience comprises:
   using the gestures to manipulate an object.

10. The system of claim 8, wherein the virtual reality processing system is a head-mounted virtual reality processing system.

11. The system of claim 8, wherein the augmented reality processing system is a head-mounted augmented reality processing system.

12. The system of claim 8, wherein the virtual reality processing system comprises a microphone.

13. The system of claim 8, wherein:
   the augmented reality processing system comprises a camera; and
   the camera is configured to capture the scene.

14. A computer program product for authoring an augmented reality application using virtual reality, the computer program product comprising:
   a non-transitory computer readable storage medium having program instructions embodied therewith, the program instructions being executable by a virtual reality processing system to cause a processing device to perform a method comprising:
      receiving, by the virtual reality processing system, a depth map from an augmented reality processing system, wherein the depth map is a map of a scene;
      generating, by the virtual reality processing system, a virtual reality environment based on the depth map;
      receiving, by gesture sensors of the virtual reality processing system, gesture inputs to manipulate the virtual reality environment;
      receiving, by a microphone of the virtual reality processing system, audio instructions to manipulate the virtual reality environment and to enable or disable objects in the virtual reality environment;
      authoring, using the virtual reality processing system, an augmented reality experience in a virtual reality environment based on the gesture inputs and audio instructions to manipulate the virtual reality environment; and
      transmitting, by the virtual reality processing system, the augmented reality experience to the augmented reality processing system.

15. The computer program product of claim 14, wherein the method further comprises transmitting, by the virtual reality processing system, the augmented reality experience to at least one additional augmented reality processing system.

16. The computer program product of claim 14, wherein:
   the augmented reality processing system comprises a camera; and
   the camera captures the scene.

17. The computer program product of claim 14, wherein the virtual reality processing system is a head-mounted virtual reality processing system.

18. The computer program product of claim 14, wherein the augmented reality processing system is a head-mounted augmented reality processing system.

19. The computer program product of claim 14, wherein the virtual reality processing system comprises a gesture sensor and a microphone, and wherein authoring the augmented reality experience comprises:
   using the gestures to manipulate an object.

20. The computer program product of claim 14, wherein the method further comprises adding content to the augmented reality experience from a database, wherein the content is a computer aided design (CAD) model selected from a plurality of CAD models stored in a database.

* * * * *